United States Patent [19]

Garcia

[11] 4,308,236
[45] Dec. 29, 1981

[54] HEAT EXCHANGERS FOR CRYSTALLIZATION OF CRYSTALLIZABLE SUSPENSIONS WHILE IN MOTION

[76] Inventor: Hilda Garcia, Manuel Gutierrez Zamora No. 190, Mexico City 20, Mexico

[21] Appl. No.: 74,266

[22] Filed: Sep. 11, 1979

[51] Int. Cl.³ .............................................. B01D 9/02
[52] U.S. Cl. ....................................... 422/254; 127/16
[58] Field of Search ................... 422/245, 254; 147/15, 147/16, 58

[56] References Cited

U.S. PATENT DOCUMENTS 2,791,333  5/1957  McKay ............................... 422/254
3,193,361  7/1965  Niedner .............................. 422/245

*Primary Examiner*—Hiram Bernstein
*Attorney, Agent, or Firm*—Ladas & Parry

[57] ABSTRACT

Heat exchanger for crystallization of crystallizable suspensions while in motion including a vertical cylindrical tank divided into an upper or deposit section containing an agitating vane and a processing section containing a plurality of superimposed subsections each partially defined by screens containing flow passes for the suspension, said screens being arranged such that alternate passes are in the periphery with the other passes in the center, heat exchanging elements located in each one of the subsections, an axial vertical shaft with internal ducts and labyrinths to which are coupled the agitating vane of said shaft a frame containing nozzles for feeding and venting the fluid that exchanges heat with said suspension, said frame resting on at least two hydraulic pistons, said pistons being located on a bridge at the upper part of the deposit section, and a discharge valve in the bottom of the lower subsection for processed suspension.

6 Claims, 3 Drawing Figures

HEAT EXCHANGERS FOR CRYSTALLIZATION OF CRYSTALLIZABLE SUSPENSIONS WHILE IN MOTION

BACKGROUND OF THE INVENTION

Heat exchangers currently being used have different forms and are furnished with different types of heat exchange elements that may be static or mobile such as tube coils having different dispositions (but not so far as the applicant is aware, spiral-shaped), hollow vanes or discs. Such known heat exchangers currently tend to suffer from deficiencies that may be detailed as: poor efficiency in heat exchange, lack of continuity in processing and poor agitation.

The present invention seeks to overcome the foregoing difficulties.

According to this invention there is provided a heat exchanger for crystallization of crystallizable suspensions whilst in motion. The heat exchanger includes a vertical cylindrical tank divided into an upper or deposit section containing an agitating vane and a processing section containing a plurality of superimposed subsections. Each superimposed subsection is partially defined by screens containing flow passes for the suspension, said screens being arranged such that alternate passes are in the periphery with the other passes in the centre. The heat exchanger also has heat exchanging elements located in each one of the subsections, an axial vertical shaft with internal ducts and labyrinths to which are coupled the agitating vane and the heat exchanging elements. There is also provided a frame located on the upper end of said shaft; which contains nozzles for feeding and venting the fluid that exchanges heat with said suspension, said frame resting on at least two hydraulic pistons, said pistons being located on a bridge at the upper part of the deposit section, and a discharge valve in the bottom of the lower subsection for processed suspension.

The location of the screens and of the suspension flow passes in each screen allow flow of the suspension downwardly and force it to travel horizontally inside each subsection. The direction of flow is alternately from the periphery toward the centre in some of the subsections and from the centre toward the periphery, in others. In the centre of the bottom of the lower subsections is located a suspension flow pass valve which upon opening permits establishment of flow of suspension through all subsections, one by one, downwardly.

The frame of the vertical shaft has feed and vent nozzles for the fluid that will exchange heat with the suspension, said nozzles forming part of the frame move along with it and are connected by means of flexible hoses to fixed nozzles. The vertical shaft has internal ducts and labyrinths for flow of heat exchange fluid directly toward the heat exchanger located in the lower subsection and also for, after circulating through continuous duct of said exchanger, going up to the next upper exchanger, and so forth, one by one, until the heat exchanger fluid outlets thrugh the vent nozzles located in the frame of the vertical shaft. The labyrinths of the vertical shaft are disposed such that, in the subsections wherein the suspension travels horizontally from the periphery toward the centre of the exchangers therein located, receive the heat exchanger fluid in their inner spiral and vent it into the outer spiral. In the alternated subsections in which suspension travels from the centre towards the periphery, the corresponding exchangers receive the heat exchanging fluid in the outer spiral and vent it into the inner spiral.

The present invention provides continuous heat exchange in that the suspension flows without interuption from the deposit section to the flow regulating valve located in the centre of the bottom of the lower subsection while the heat exchanging fluid feeds and vent continuously through the nozzles purposely located in the frame. Contra-directional heat exchange is produced by a preferred embodiment of this invention while the suspension descends from one subsection to another it travels in one horizontal direction, while the heat exchanging fluid travels in the opposite direction. Agitation is produced by the agitating vane as well as each one of the heat exchangers which are all subjected to a continuous movement of ascent and descent in each one of the sections or subsections while the suspension travels horizontally and continuously in each one of said subsections.

SUMMARY OF THE INVENTION

The present invention refers to a heat exchanger with an agitator for the crystallization in motion of a crystallized syrup. The heat exchanger is constituted by a vertical cylindrical tank divided into an upper section and several superimposed lower sections. The superimposed lower sections are each partially defined by screens, which include stages for the alternate passing of the suspension from the inner periphery of the tank toward the axial centre and from the centre to the periphery, and so forth. Moreover, the lower sections in each heat exchanging element, which are linked to a vertical central shaft, from which agitating vanes extend for agitation of the system. The shaft has on its upper end a frame containing nozzles for inlet and outlet of heat exchanging fluid. The frame rests on two hydraulic pistons, which themselves rest on a bridge located on the upper part of the deposit section of the tank. In the bottom of the tank is located an outlet for processed material, controlled by a valve.

BRIEF DESCRIPTION OF THE DRAWINGS

The invention will now be described with reference to the accompanying drawings in which.

DETAILED DESCRIPTION OF THE INVENTION

Figure 1:
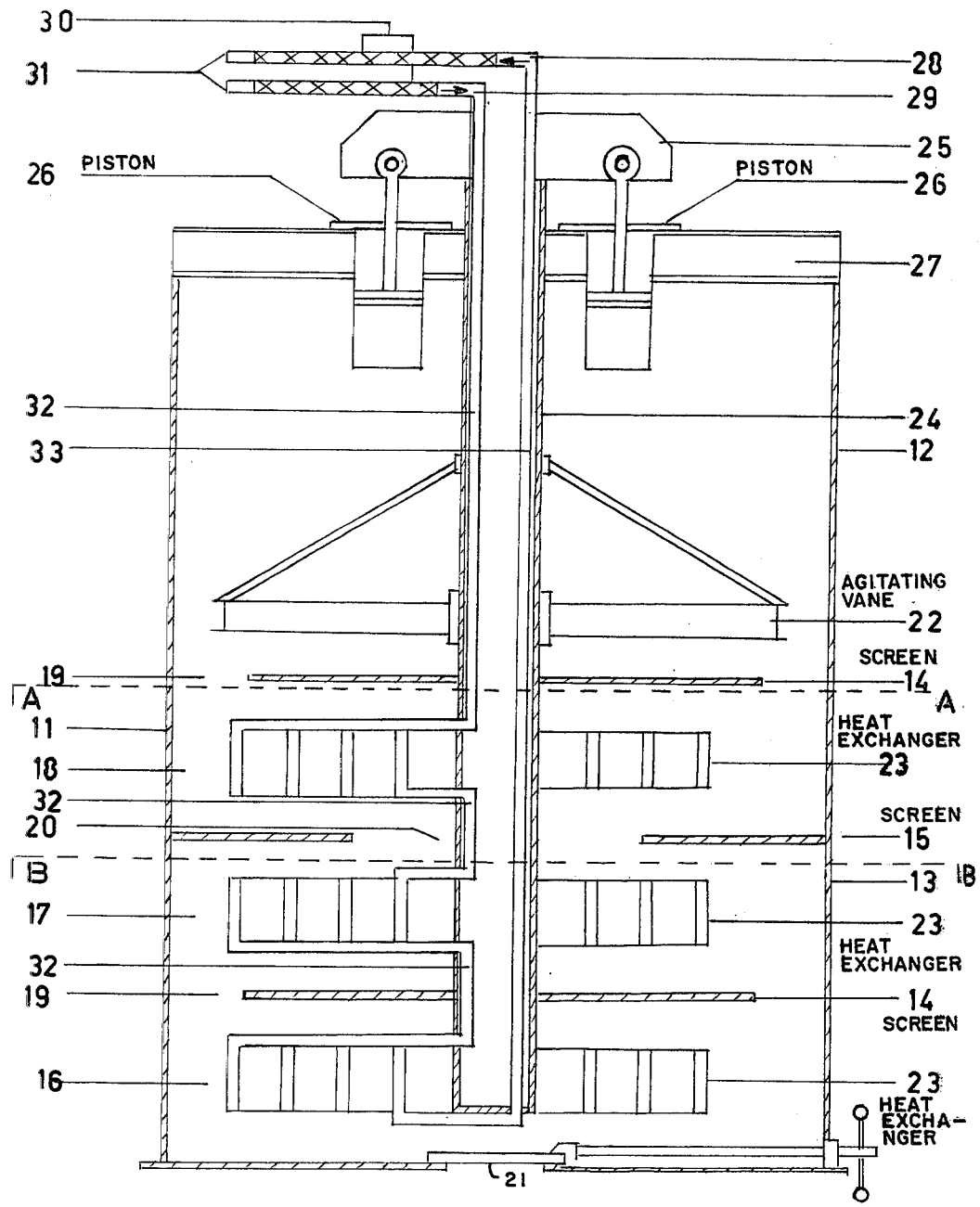
FIG. 1 is a cross sectional view of a heat exchanger in accordance with this invention.

In FIG. 1 a vertical cylindrical body 11 is divided into an upper deposit section 12 and a lower processing section 13, the section 13 being subdivided into subsections 16, 17 and 18. Internal screens 14 and 15 partially defining the subsections 16, 17, 18 are arranged so that the screen 14 provides a peripheral suspension step 19 while screen 15 provides a central suspension step 20.

In a bottom (as viewed in FIG. 1) end wall of the body is a flow regulating valve 21. An agitating vane 22 is located in the upper or deposit section 12 and heat exchanging elements 23 are located in each of the subsections 16, 17 and 18.

A vertical shaft 24 is secured to an upper end frame 25 which rests on hydraulic pistons 26, the pistons resting on a bridge 27 at the top of the body 11. The frame supports the heat exchanging fluid feed nozzle 28 as well as a vent nozzle 29 for the fluid.

The feed and vent nozzles are connected by flexible hoses, to fixed nozzles 31. Labyrinths 32 and ducts 33 are internally located in the vertical shaft 24 so that duct 33 is able to conduct heat exchanging fluid from the feed nozzle 28 directly to the lower heat exchanging element 23 and feed the heat exchange fluid into the inner spiral of lower element 23. The heat exchanging fluid is vented from the outer spiral of lower element 23 to ascend to the intermediate heat exchanging element through labyrinth 32, thence to the top element 23, to finally emerge in vent nozzle 29.

The hydraulic pistons 26 acting through the frame 25 and the vertical shaft 24 transmit their ascent and descent movements simultaneously to the vane 22 and heat exchanging element 23 thereby producing agitation.

Figure 2:
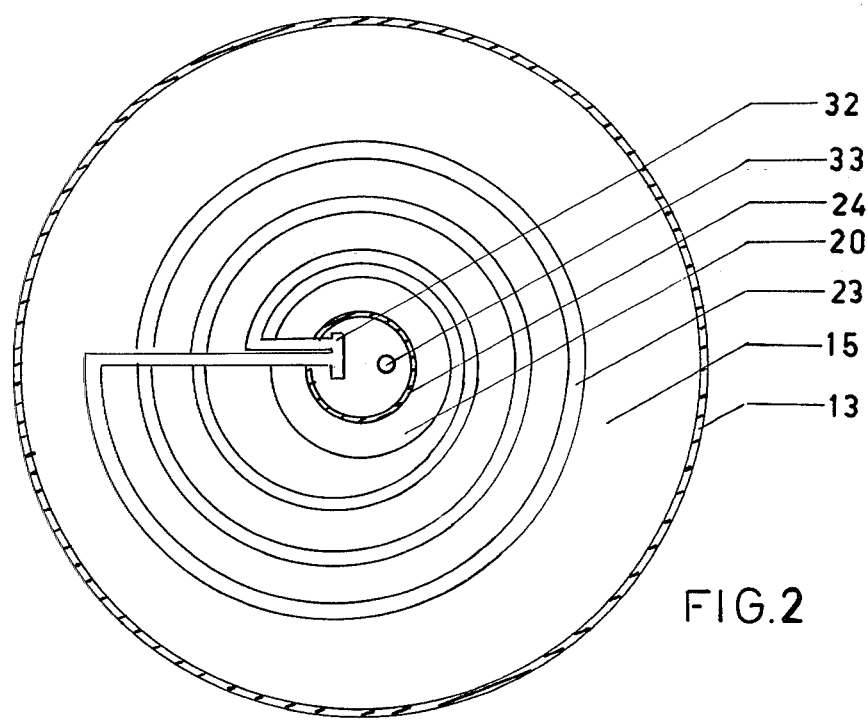
FIG. 2 is a horizontal cross section taken along line A—A of FIG. 1.

Turning to FIG. 2, there is shown the body 13 which is common to all subsections, the screen 15 with its suspension flow pass 20 centrally dispersed, the heat exchanging element 23 which is shown as a continuous duct spirally disposed on a horizontal plane, as well as the vertical shaft 24 containing duct 33 and labyrinths 32. The continuous duct of the heat exchanging element is fed at its inner spiral and venting on the outer spiral.

Figure 3:
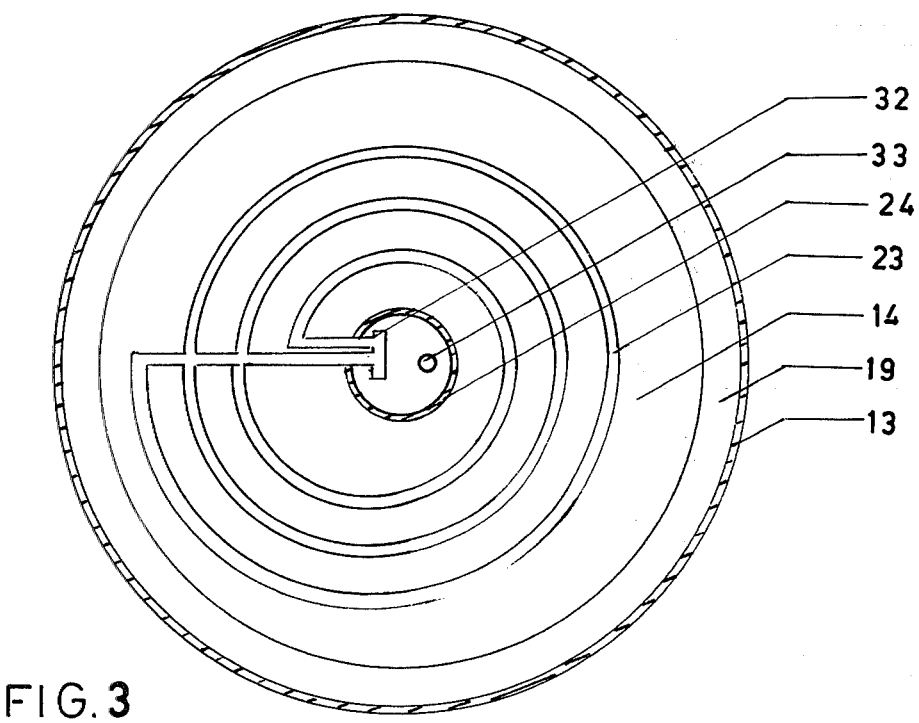
FIG. 3 is a horizontal cross section taken along line B—B of FIG. 1.

Referring to FIG. 3, the screen 14 is shown with suspension flow pass 19 on the periphery and the continuous duct 23 which is fed at the outer spiral and vented on the inner one.

To give a detailed account of the process strictly in countercurrent, it is commented that the suspension enters from deposit section 12 to subsection 18 through the peripheral flow pass of the screen 14. Once within the subsection 18 it is -- compelled to travel horizontally, from the periphery towards the centre until reaching flow pass 20 located in the centre of screen 15. Once again the suspension must travel horizontally within subsection 17, now from the centre towards the periphery, until reaching peripheral pass 19 contained in the next screen 14. Yet again the suspension must travel horizontally in subsection 16, now from the periphery towards the centre, until reaching discharge valve 21 centrally located at the bottom. While the suspension travels downwardly as described above, the heat exchanging fluid flows upwardly through each one of the heat exchanging elements 23 and while the suspension travels horizontally in each subsection, in some from the periphery towards the centre and in other ones from the centre towards the periphery, the heat exchanging fluid flows the inner spiral to outer spiral and from outer spiral to inner spiral, respectively, so that heat exchange takes place in a contra-directional fashion, resulting in continuous suspension processing.

What I claim is:

1. A heat exchanger for crystallization of crystallizable suspensions whilst in motion including a vertical cylindrical tank divided into an upper or deposit section containing an agitating vane and a processing section containing a plurality of superimposed subsections each partially defined by screens containing flow passes for the suspension, said screens being arranged such that alternate passes are in the periphery with the other passes in the centre, heat exchanging elements located in each one of the subsections, an axial vertical shaft with internal ducts and labyrinths to which are coupled the agitating vane and the heat exchanging elements and located on the upper end of said shaft a frame containing nozzles for feeding and venting the fluid that exchanges heat with said suspension, said frame resting on at least two hydraulic pistons, said pistons being located on a bridge at the upper part of the deposit section, and a discharge valve in the bottom of the lower subsection for processed suspension.

2. A heat exchanger as claimed in claim 1 wherein the heat exchanging elements comprise continuous ducts spirally disposed on a horizontal plane, said ducts being arranged to be fed heat exchanging fluid on the outer spiral and vented on the inner spiral when contained in subsections in which said suspension travels horizontally from the centre towards the periphery and said ducts being arranged to be fed in the inner spiral and vented in the outer one when contained in subsections wherein the suspension travels horizontally from the periphery towards the centre, whereby a contra-directional flow of heat exchange fluid and suspension is produced.

3. A heat exchanger as claimed in claim 1 or 2 wherein the ducts and labyrinths contained in the vertical shaft are disposed so as to conduct the heat exchanging fluid directly to the lower heat exchanging element, thence to the upper, adjacent element and so forth, one by one, upwardly, until the heat exchanging fluid vents through the vent nozzle contained in the frame.

4. A heat exchanger as claimed in claim 3, in which feed and vent of heat exchanging fluid take place through flexible hoses connected to fixed nozzles.

5. A heat exchanger as claimed in claim 4, in which in operation, agitation is effected by two hydraulic pistons transmitting ascent and descent movement to the frame mounted on the upper end of the vertical shaft, to which shaft are coupled the vane situated in the deposit section as well as the heat exchanging elements located in each one of the subsections the movement of these components in the suspension inducing agitation to said suspension.

6. A heat exchanger as claimed in claim 5, in which is included a flow regulating valve for discharging of processed suspension located in the centre of the bottom of the lower subsection.

* * * * *